United States Patent
Iovanna et al.

(10) Patent No.: US 10,225,173 B2
(45) Date of Patent: Mar. 5, 2019

(54) METHOD TO PROVIDE ELASTICITY IN TRANSPORT NETWORK VIRTUALISATION

(71) Applicant: Telefonaktiebolaget LM Ericsson (publ), Stockholm (SE)

(72) Inventors: Paola Iovanna, Pisa (IT); Teresa Pepe, Pisa (IT); Fabio Ubaldi, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 133 days.

(21) Appl. No.: 15/127,856

(22) PCT Filed: Sep. 29, 2014

(86) PCT No.: PCT/EP2014/070794
§ 371 (c)(1),
(2) Date: Sep. 21, 2016

(87) PCT Pub. No.: WO2015/144257
PCT Pub. Date: Oct. 1, 2015

(65) Prior Publication Data
US 2017/0099211 A1    Apr. 6, 2017

Related U.S. Application Data (60) Provisional application No. 61/969,362, filed on Mar. 24, 2014.

(51) Int. Cl.
*H04L 12/751*    (2013.01)
*H04L 12/931*    (2013.01)
(Continued)

(52) U.S. Cl.
CPC .......... *H04L 45/02* (2013.01); *G06F 9/45558* (2013.01); *H04L 41/12* (2013.01);
(Continued)

(58) Field of Classification Search
CPC ..... H04L 45/125; H04L 45/127; H04L 45/28; H04L 45/30; H04L 45/302; H04L 45/62;
(Continued)

(56) References Cited

U.S. PATENT DOCUMENTS

2013/0070638 A1    3/2013 Iovanna et al.
2013/0114409 A1    5/2013 Iovanna et al.
(Continued)

FOREIGN PATENT DOCUMENTS

CN    103051565 A    4/2013

OTHER PUBLICATIONS

Project Proposal; Project: DRE Ad-hoc; MEF Plenary Mar. 2012—Munic—2012.
(Continued)

*Primary Examiner* — Eric Myers
(74) *Attorney, Agent, or Firm* — Baker Botts, LLP (57) ABSTRACT

A method for providing support for elasticity in network virtualisation of a heterogeneous, multi-domain network comprising receiving (802) from network domains information about elasticity capability of physical paths in said network domains; summarising (804) physical paths in said network domains into virtual links; and producing (806) a topology of a virtual network overlaying the multi-domain network by associating elasticity parameters with the virtual links, wherein the elasticity parameters are inferred from the physical paths.

15 Claims, 9 Drawing Sheets

(51) Int. Cl.
*H04L 12/715* (2013.01)
*H04L 12/717* (2013.01)
*H04L 12/24* (2006.01)
*G06F 9/455* (2018.01)

(52) U.S. Cl.
CPC .......... *H04L 41/5019* (2013.01); *H04L 45/04* (2013.01); *H04L 45/42* (2013.01); *H04L 49/70* (2013.01); *G06F 2009/45595* (2013.01)

(58) Field of Classification Search
CPC ......... H04L 45/64; H04L 45/02; H04L 49/70; H04L 45/04; H04L 45/42; H04L 41/5019; H04L 41/12; H04B 10/27; H04Q 11/0062; H04Q 2011/0073; H04Q 2011/009; H04J 14/02; G06F 9/45558; G06F 2009/45595
See application file for complete search history.

(56) References Cited

U.S. PATENT DOCUMENTS

2013/0250770 A1    9/2013  Zou et al.
2016/0249118 A1*   8/2016  Ou ..................... H04J 14/0256

OTHER PUBLICATIONS

Virtual Network Planning for Converged Optical and Data Centers: Ideas and Challenges by Weigang Hou et al.; IEEE Network—Nov./Dec. 2013.
HELIOS: A Hybrid Electrical/Optical Switch Architecture for Modular Data Centers by Nathan Farrington et al.; SIGCOMM '10, Aug. 30-Sep. 3, 2010, New Delhi, India;—2010.
Circuit Switching Under the Radar With Reactor by He Liu et al.; USENIX The Advanced Computing Systems Association; This paper is included in the Proceedings of the 11th USENIX Symposium on Networked Systems Design and Implementation (NSDI '14), Seattle, WA—Apr. 2-4, 2014.
Toward Deeply Virtualized Elastic Optical Networks by Masahiko Jinno and Akira Hirano; OFC/NFOEC Technical Digest—Optical Society of America 2013.
International Search Report for International application No. PCT/EP2014/070794—dated Jan. 28, 2015.
Chinese Search Report issued for Application No. 2014800792013 (no translation available)—dated Nov. 14, 2018.

* cited by examiner

Transport Controller

Fig. 6

Service Controller

METHOD TO PROVIDE ELASTICITY IN TRANSPORT NETWORK VIRTUALISATION

PRIORITY

This nonprovisional application is a U.S. National Stage Filing under 35 U.S.C. § 371 of International Patent Application Serial No. PCT/EP2014/070794 filed Sep. 29, 2014, and entitled "A Method to Provide Elasticity in Transport Network Virtualization" which claims priority to U.S. Provisional Patent Application No. 61/969,362 filed Mar. 24, 2014, both of which are hereby incorporated by reference in their entirety.

TECHNICAL FIELD

The present invention relates to Software Defined Networking, in general, and in particular to providing elasticity in transport network virtualisation.

BACKGROUND

Network Virtualisation (NV) is a process in which logical representation of underlying physical networks is created. Such a logical (or virtual) network is decoupled from hardware and software of the underlying physical network resources. By creating virtual network(s) it is possible to simulate the hardware network resources by running specialised software on general hardware. For example, a switch or a router can be simulated on a general purpose computer that is equipped with ports for connecting physical links. All the functionality of the device is separated from the hardware and simulated as a "virtual instance". In such a virtual switch or router the hardware part is responsible for receiving packets and forwarding these packets towards their destination, but it is the software in the virtual network of a number of these switches or routers that allows for deploying and management of services and underlying network resources. Thanks to the centralization of control functions and separation from data-plane, SDN is a valuable enabler for network virtualisation.

Network Virtualisation (NV) is a very promising trend of enabling effective managing of data-centers. In this context the transport network assumes a new role of providing dynamically E2E (end-to-end) connectivity. One of the main aspects of NV is the ability to create a smart logical and abstract view of the physical network resources (like packet and optical switches, routers, etc.) that allows for hiding hardware complexity and constrains.

With the advent of datacenter services the transport network is likely to become more flexible and more programmable and software-driven. The network virtualisation of functions pushes for organization of the functions in a cloud environment and the distribution of the data-centers in the network. In such context the connections among such data-centers (located in WAN—Wide Area Network) must be virtualised and represented in an abstract way in order to simplify handling of datacenter service according to the paradigm of Infrastructure as a Service (IaaS).

Network Virtualisation (NV) is considered a key mechanism to decouple network from service. With the term Network Virtualisation referred herein associated is the ability to create a smart logical and abstract view of the physical network resources that allow for deployment and management of services and use of the underlying network resources.

SUMMARY

According to a first aspect of the present invention there is provided a method for providing support for elasticity in network virtualisation of a heterogeneous, multi-domain network. The method comprises receiving from network domains information about elasticity capability of physical paths in said network domains and summarising physical paths in said network domains into virtual links. The method also comprises producing a topology of a virtual network overlaying the multi-domain network by associating elasticity parameters with the virtual links, wherein the elasticity parameters are inferred from the physical paths.

According to a second aspect of the present invention there is provided a method of routing a service through a heterogeneous, multi-domain network in response to a service request. The method comprises receiving from a Transport Controller a topology of a virtual network overlaying the multi-domain network, wherein the topology of the virtual network has been produced by associating elasticity parameters with virtual links. The virtual links have been created by summarising physical paths and the elasticity parameters have been inferred from the physical paths, wherein information about elasticity capability of physical paths in said network domains has been received by said Transport Controller from said network domains. The method also comprises computing an end-to-end virtual path across the virtual network in response to the service request based on a Service Level Agreement associated with the service request and the elasticity parameters of the virtual links.

According to a third aspect of the present invention there is provided a Transport Controller for providing support for elasticity in network virtualisation of a heterogeneous, multi-domain network. The Transport Controller comprises a processor and a memory. Said memory contains instructions executable by said processor. The Transport Controller is operative to receive from network domains information about elasticity capability of physical paths in said network domains and summarise physical paths into virtual links. The Transport Controller is also operative to produce a topology of a virtual network by associating elasticity parameters with the virtual links, wherein the elasticity parameters are inferred from the physical paths.

According to a fourth aspect of the present invention there is provided a Software Defined Networking Controller comprising a Transport Controller as defined above.

According to a fifth aspect of the present invention there is provided a Service Controller for use in routing a service through a heterogeneous, multi-domain network in response to a service request. The Service Controller comprises a processor and a memory, said memory contains instructions executable by said processor. The Service Controller is operative to receive from a Transport Controller a topology of a virtual network overlaying the multi-domain network, wherein the topology of the virtual network was produced by associating elasticity parameters with virtual links. The virtual links have been created by summarising physical paths and the elasticity parameters have been inferred from the physical paths. Information about elasticity capability of physical paths in said network domains has been received by said Transport Controller from said network domains. The Service Controller is further operative to compute an end-to-end virtual path across the virtual network in response to the service request based on a Service Level Agreement associated with the service request and the elasticity parameters of the virtual links.

According to a sixth aspect of the present invention there is provided a Software Defined Networking Orchestrator comprising a Service Controller as defined above.

According to a seventh aspect of the present invention there is provided a Transport Controller for providing support for elasticity in network virtualisation of a heterogeneous, multi-domain network. The Transport Controller comprises a receiver for receiving from network domains information about elasticity capability of physical paths in said network domains, a summariser for summarising physical paths in said network domains into virtual links. The Transport Controller also comprises a topology engine for producing a topology of a virtual network overlaying the multi-domain network by associating elasticity parameters with the virtual links, wherein the elasticity parameters are inferred from the physical paths.

According to an eight aspect of the present invention there is provided a Service Controller for routing a service through a heterogeneous, multi-domain network in response to a service request. The Service Controller comprises a receiver for receiving from a Transport Controller a topology of a virtual network overlaying the multi-domain network. The topology of the virtual network has been produced by associating elasticity parameters with virtual links, and the virtual links have been created by summarising physical paths. The elasticity parameters have been inferred from the physical paths, wherein information about elasticity capability of physical paths in said network domains has been received by said Transport Controller from said network domains. The Service Controller also comprises a virtualised Path Computation Engine for computing an end-to-end virtual path across the virtual network in response to the service request based on a Service Level Agreement associated with the service request and the elasticity parameters of the virtual links Further features of the present invention are as claimed in the dependent claims.

BRIEF DESCRIPTION OF THE DRAWINGS

The present invention will be understood and appreciated more fully from the following detailed description taken in conjunction with the drawings in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary details.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

Figure 1:
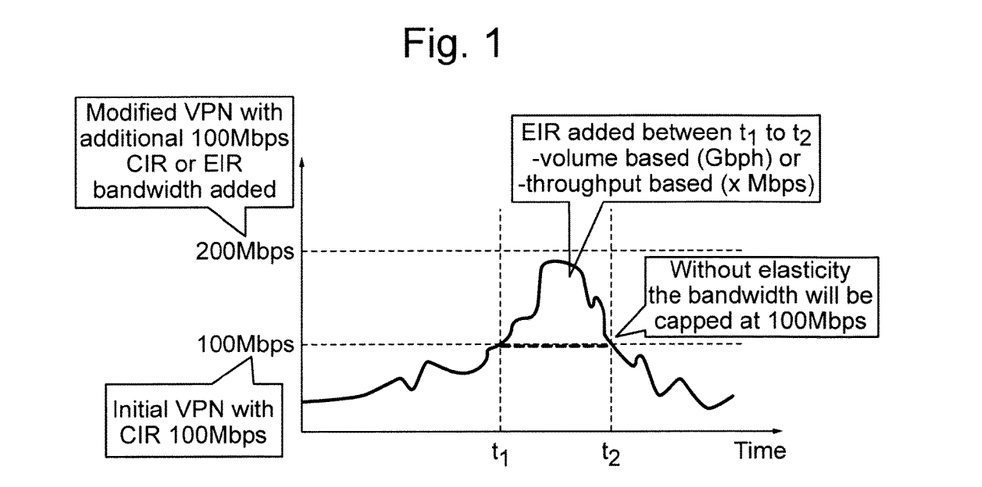
FIG. 1 is a simple illustration of the concept of elasticity in a network.

Elasticity is an important requirement from transport network providers because elasticity enables efficient resource usage and it maximizes the revenue of the network. Elasticity means the ability to dynamically provide enough resources to the service during its lifetime in order to assure the agreed SLA (Service Level Agreement). This means that if service requires more or less network resources in time, the network has to be able to quickly react by adding or releasing physical resources as shown in FIG. 1. As illustrated in FIG. 1 thanks to elasticity it is possible to increase bandwidth between time $t_1$ and $t_2$ when demand for bandwidth exceeds Committed Information Rate (CIR) and deliver the service at increased bandwidth within excess information rate (EIR). At time $t_2$ the demand for bandwidth drops back to CIR and the bandwidth above CIR is released.

The inventors realised that there is no a solution supporting elasticity in Network Virtualisation for an efficient use of the underlying physical network resources.

Providing a solution to support elasticity in Software Defined Networking (SDN) context is a complex task that must take into account the fact that the current transport network are heterogeneous and formed by multiple multi-layer/multivendor domains.

One of the issues to be fixed in a DC (Data Center) management framework is how to provide cross-optimization among the DC resources and transport resources. Depending on embodiment the DC resources may include storage and/or computing resources distributed in different locations of the network. The transport resources, instead, provide the physical connection of the DC resources. To achieve the cross-optimization among the DC resources and transport resources and facilitate automatic service provisioning it is important to provide a virtualisation of the transport layer that on one hand allows the transport to exploit capability of providing elasticity to optimize resources and on the other hand can be easily associated with the service requests.

Figure 7:
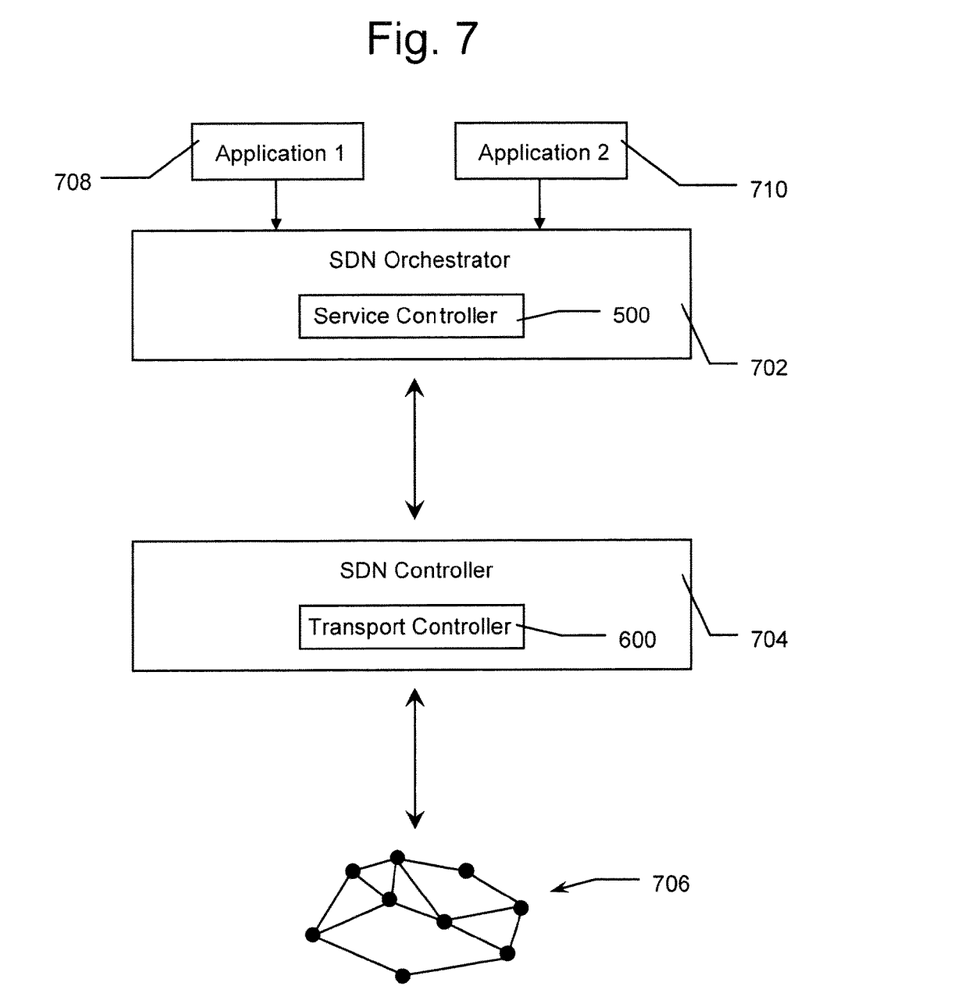

Nowadays an efficient virtualisation of the transport layer that includes elasticity parameters does not exist; hence an SDN Orchestrator (also known as Data Center (DC) Orchestrator) cannot consider the transport network working at over-provisioning level. FIG. 7 shows one embodiment of a Software Defined Networking solution with the SDN Orchestrator 702 and SDN Controller 704. The SDN Orchestrator 702 works on the virtual topology. The SDN Orchestrator 702 optimizes E2E resources, computes E2E paths, negotiates the SLA with the client, etc. The SDN controller 704, instead, is responsible for summarising the physical resources to provide the necessary information to the SDN Orchestrator 702 to create virtual topology. The inventors realised that if a parameter of elasticity is exposed to the SDN orchestrator, taking into account the capability of the transport network to support elasticity in effective way, resource optimization can be achieved. To achieve that it is necessary to define elasticity parameters that are independent of the specific technology of the transport and facilitate the DC cross-layer optimization whilst well represent the capability of each transport domain to provide elasticity. It may be that each domain provides different elasticity capability, some based on over-provisioning, other on pre-empting low priority traffic in case elastic bandwidth is required, etc.

To optimize the network resources it is important to provide a method that allows each transport network domain to provide elasticity according its internal capability and enable each domain to do the best in terms of resource optimization.

Moreover, the method should harmonize different techniques in homogeneous parameters that can enable E2E (end-to-end) path computation for service support. In some embodiments the services can require differentiated elasticity, hence it is important to define a method that supports such differentiation at a service level, while exploiting the best each domain can provide.

The purpose of the solution disclosed in this document is to define a method for including elasticity in the process of Network Virtualisation in a multi-domain-multi-technology scenario. This document discloses new parameters to include in the network virtualisation that allow heterogeneous network domains to exploit different techniques for supporting elasticity and combining them in a most efficient way.

Figure 2:
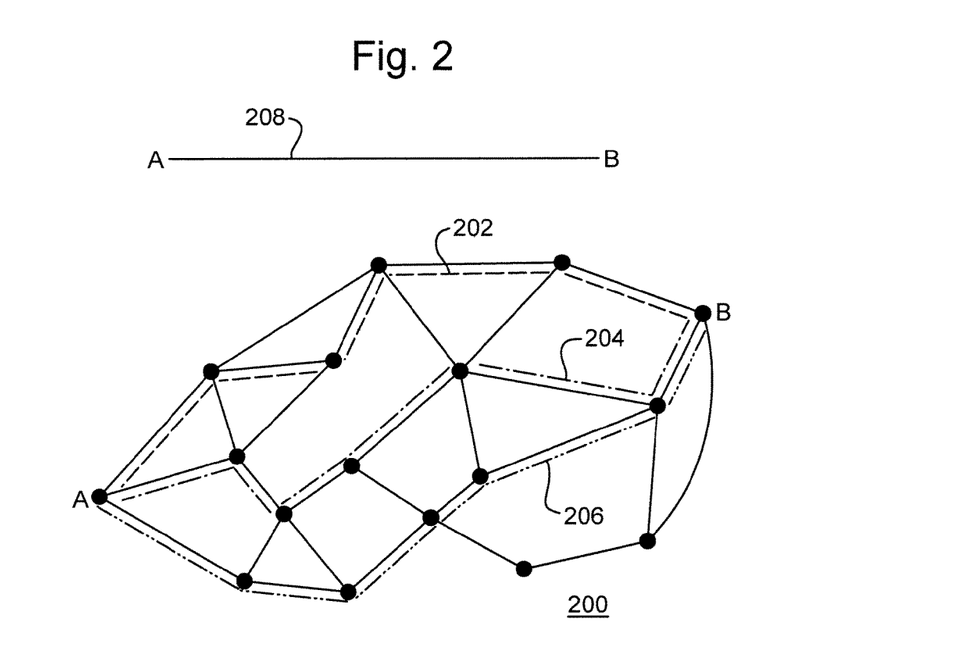
FIG. 2 is a simple illustration of a physical link, physical path and a virtual link.
Figure 3:
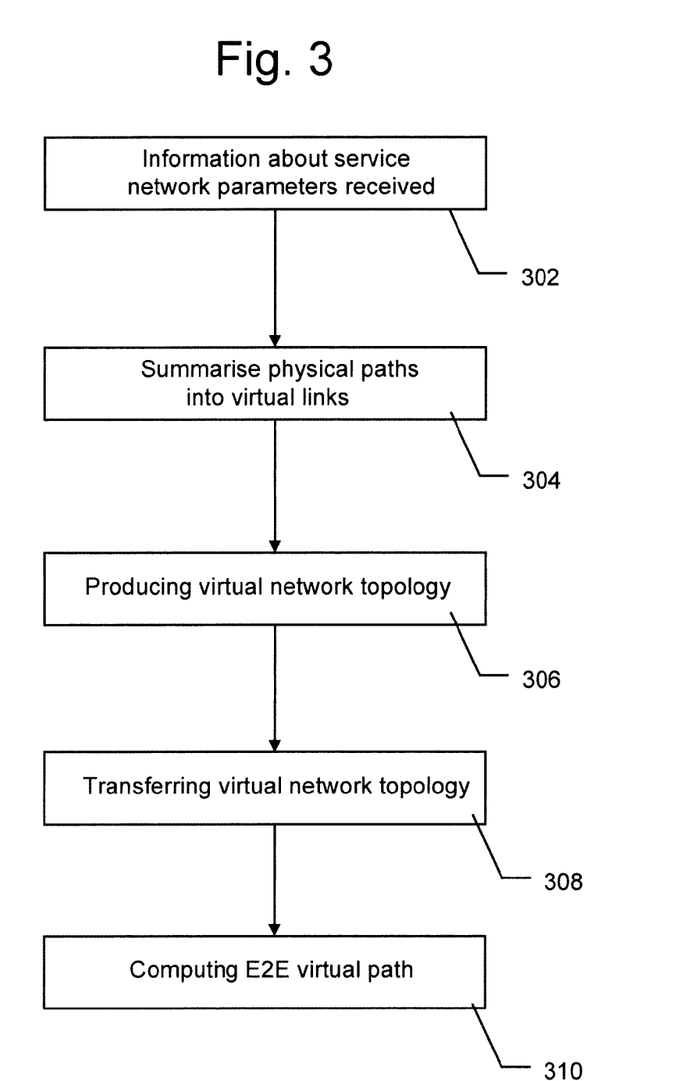
FIG. 3 is a diagram illustrating a method for providing support for elasticity in network virtualisation in one embodiment of the present invention.

With reference to FIG. 3 an embodiment of a method for providing support for elasticity in network virtualisation of a heterogeneous, multi-domain network is presented. The method comprises receiving, 302, from network domains information about elasticity capability of physical paths in said network domains. The way the domains provide such information is out of scope of this document, but depending on embodiment this information may be sent periodically or on demand. In one embodiment it is possible to have a local entity that collects connectivity information provided by each domain and translates this information into a common set of parameters so as to provide a homogenous representation of the underlying domain. In a preferred embodiment the information about elasticity capability of physical paths is received as part of information about service network parameters. In the next step the method comprises summarising, 304, physical paths into virtual links. When we refer to a physical network we talk about a physical link which is a direct connection between two neighbouring nodes, and a physical path is a sequence of one or more physical links connecting two nodes. A virtual link corresponds to one or more physical paths (sets of physical links and nodes) connecting two edge nodes in one of the underlying network domains as shown in FIG. 2. In FIG. 2 a network domain 200 is shown with two edge nodes A and B connected by three physical paths 202, 204 and 206. A virtual link 208 shown above the network domain 200 in FIG. 2 corresponds to the three physical paths 202-206 after the operation of summarisation. The elasticity parameters that represent the elasticity capabilities of the underlying physical network are associated with each virtual link. In network virtualisation, and especially in a multi-domain scenario, a virtual path is an end-to-end path composed by more than one virtual link (one virtual link for a network domain). In the step of summarising, 304, physical paths into virtual links one virtual link for each couple of end nodes is constructed for each network domain.

The embodiment further comprises producing a topology of a virtual network (virtual topology), 306, overlaying the multi-domain network by associating elasticity parameters with the virtual links. The elasticity parameters are inferred from the physical paths. Based on the specific elasticity techniques implemented in the physical domain (e.g., Bandwidth variation of a Label Switched Path (LSP) via Resource Reservation Protocol (RSVP) in Multiprotocol Label Switching (MPLS) network or Elastic Optical Network techniques) each domain may provide information about the maximum bandwidth increment on a physical path. The method preferably comprises transferring 308 the topology of the virtual network to a Service Controller for computing, 310, an end-to-end (E2E) virtual path across the virtual network. The virtual path is computed in response to a service request and is based on a Service Level Agreement (SLA) associated with the service request and elasticity parameters of the virtual links.

Preferably the method is performed in a Transport Controller.

Elasticity capability is information about how each network domain is able to provide elasticity; for example by over provisioning, by re-routing in certain time, by modifying the amount of bandwidth allocated for the specific path (e.g. the case of MPLS that keeps the same LSP and modifies the amount of bandwidth). Elasticity capability is a characteristic of a network domain. Elasticity parameters, on the other hand, refer to the virtualised network. In short, elasticity parameters represent elasticity capability in the virtual network. For example, maximum elastic bandwidth with traffic interruption is an elasticity parameter associated with a virtual link and indicates the maximum increase of bandwidth that such virtual link can provide without guaranteeing uninterrupted traffic. Maximum elastic bandwidth without traffic interruption indicates the amount of bandwidth that such a virtual link can provide guaranteeing no traffic disruption whereas, the maximum elastic bandwidth with multipath routing indicates the amount of bandwidth that can be provided sending traffic on two or more paths concurrently. The value of the elasticity parameter for a virtual link depends on elasticity capability of physical links forming physical paths in the network domain. Said value is determined by the lowest value of the increase of bandwidth of individual physical links forming the physical path.

Elasticity parameters of virtual links provide information about possible adjustment of bandwidth, which, in turn, allow for creating a virtual path that is optimised for the service request and it may prevent the need to renegotiate SLA, which might be necessary if it was not possible to exploit the elasticity of the virtual links.

In a preferred embodiment the received service network parameters are complemented with one or more of the following elasticity parameters:
maximum elastic bandwidth with traffic interruption;
maximum elastic bandwidth without traffic interruption;
maximum elastic bandwidth with multipath routing.

Different domains in the network can support such elasticity parameters in different ways depending on the technology and control of the domains, but they are represented as homogenous from virtualisation point of view.

Figure 10:
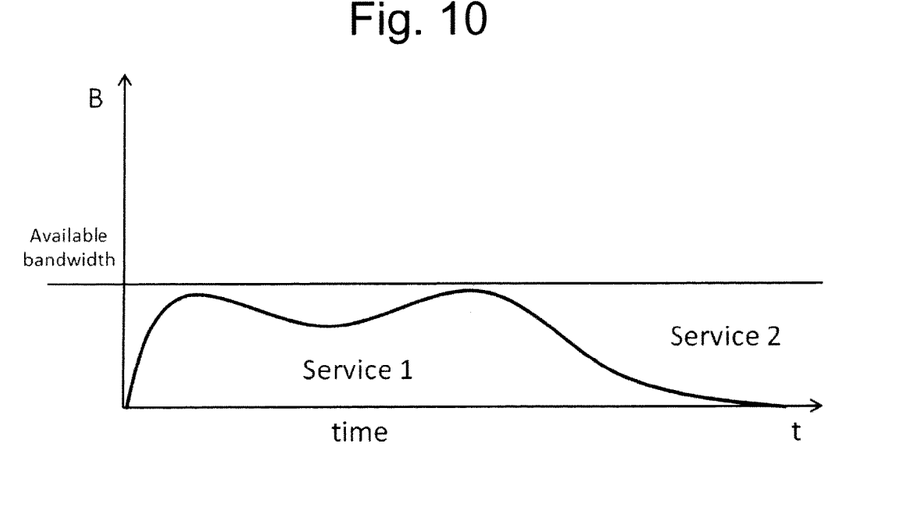
FIG. 10 is an illustration showing two services sharing available bandwidth.

The method allows the SDN Orchestrator 702 to perform a more efficient E2E routing providing better allocation of network resources with smart aggregation of services inside the domains. A smart aggregation of the service means an optimised use of resources in order to provide more services more quickly. For instance, if we have a service with variable bandwidth it can share the unused bandwidth with another service with low priority as shown in FIG. 10.

When a new service is required in a service request, the SDN Orchestrator 702 may define a level of elasticity that the network is capable of providing based on the topology of the virtual network of the E2E network where elasticity parameters are represented. Then the SDN Orchestrator 702 can decide whether to support the features required in the service request, not support, or negotiate different SLA, etc.

The elasticity parameters must be general in order to be independent of the specific technology of the transport domains and to allow the transport domains to support these parameters in a simple way. The elasticity parameters mentioned above (with traffic interruption, without traffic interruption, multi-path) are abstract parameters that are independent of specific technology, but, at the same time, they are also simple to associate with any technology of each transport domain.

In case one domain can provide only over-provisioning, this is the technique the domain uses. In case a domain can support more efficient technique (e.g. Elastic Optical Networking, etc.) this techniques may be enabled.

Figure 6:
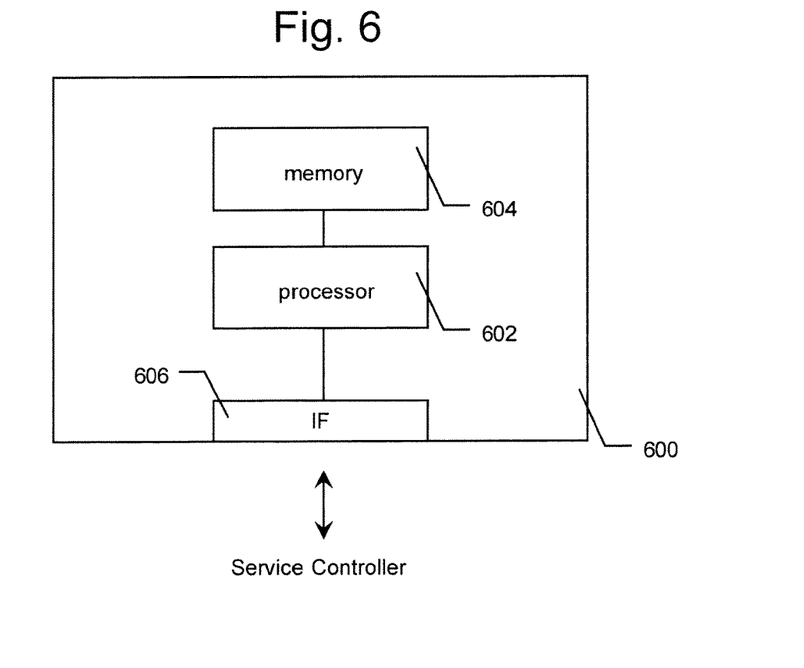
FIG. 6 is a diagram illustrating a transport controller in one embodiment of the present invention.

Preferably, information about the elasticity capability of physical paths is received by the Transport Controller 600 as information of elasticity capability of individual physical links forming said physical paths.

Preferably, the service network parameters received from network domains may include, for example, availability of resources, delay, resiliency, jitter, etc. . . .

Figure 4:
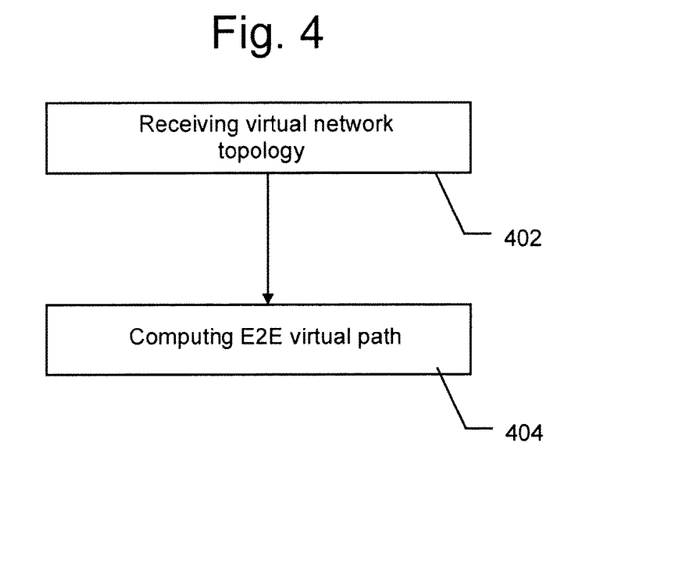
FIG. 4 is a diagram illustrating a method for providing support for elasticity in network virtualisation in one embodiment of the present invention.

With reference to FIG. 4 another embodiment of a method of routing a service through a heterogeneous, multi-domain network in response to a service request is disclosed. The method comprises receiving, 402, from a Transport Controller 600 a topology of a virtual network (virtual topology) overlaying the multi-domain network. As explained in the description of operations illustrated in FIG. 3 in a preferred embodiment the topology of the virtual network is produced by associating elasticity parameters with virtual links. The virtual links, in turn, are created by summarising physical paths whereas the elasticity parameters are inferred from the physical paths. Information about elasticity capability of the physical paths in domains of said network used for inferring the elasticity parameters is received by the Transport Controller 600 from the network domains. In a preferred embodiment the information about elasticity capability of physical paths is received as part of information about service network parameters. In the next step an end-to-end (E2E) virtual path across the virtual network is computed, 404, in response to the service request. The computation is based on a Service Level Agreement associated with the service request and the elasticity parameters of the virtual links.

Figure 5:
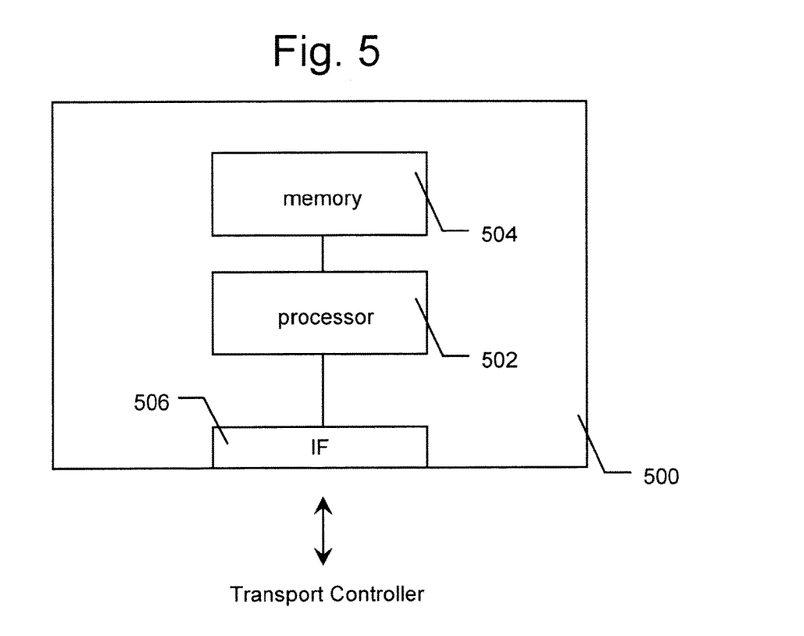
FIG. 5 is a diagram illustrating a service controller in one embodiment of the present invention.

In a preferred embodiment the above method is performed in a Service Controller 500.

Preferably the Service Controller 500 is implemented in an SDN Orchestrator 702. The SDN orchestrator, or more specifically the Service Controller, is appointed to manage E2E resources. It validates and authorizes resource requests and consequently manages the underlying network working on the virtual topology.

With reference to FIG. 6 one embodiment of a Transport Controller 600 for providing support for elasticity in network virtualisation of a heterogeneous, multi-domain network in response to a service request is disclosed. The Transport Controller 600 comprises a processor 602 and a memory 604. The memory 604 contains instructions executable by the processor 602, wherein the Transport Controller 600 is operative to receive from network domains information about elasticity capability of physical paths in said network domains. In a preferred embodiment the information about elasticity capability of physical paths is received as part of information about service network parameters. The Transport Controller is further operative to summarise physical paths into virtual links and to produce a topology of a virtual network overlaying the multi-domain network by associating elasticity parameters with the virtual links. The elasticity parameters are inferred from the physical paths.

In a preferred embodiment, once the topology of the virtual network is produced the Transport Controller 600 transfers it to a Service Controller 500 for use in computing an end-to-end (E2E) virtual path across the virtual network. In a preferred embodiment the topology of the virtual network is transmitted from the Transport Controller 600 to the Service Controller 500 via a communication interface 606.

FIG. 5, in turn, illustrates one embodiment of a Service Controller 500 for use in routing a service through a heterogeneous, multi-domain network in response to a service request. The Service Controller 500 comprises a processor 502 and a memory 504, wherein the memory 504 contains instructions executable by said processor 502. The Service Controller 500 is operative to receive from a Transport Controller 600 a topology of a virtual network overlaying the multi-domain network. As explained above in the description of operations illustrated in FIG. 3 in a preferred embodiment the topology of the virtual network is produced by associating elasticity parameters with virtual links. The virtual links, in turn, are created by summarising physical paths whereas the elasticity parameters are inferred from the physical paths. Information about elasticity capability of the physical paths in domains of said network used for inferring the elasticity parameters is received by the Transport Controller 600 from the network domains. In a preferred embodiment the information about elasticity capability of physical paths is received as part of information about service network parameters. The Service Controller 500 is further operative to compute an end-to-end (E2E) virtual path across the virtual network in response to the service request and based on a Service Level Agreement associated with the service request as well as the elasticity parameters of the virtual links. In a preferred embodiment the topology of the virtual network is received at the Service Controller 500 via a communication interface 506.

The Service Controller 500 can use a number of virtual links in order to create the virtual path, or, in other words, there may be more than one possible E2E virtual path connecting the same pair of end nodes. In one embodiment the service controller 500 may increase a bandwidth of a virtual link (or virtual links) along the E2E path within limit defined by elasticity parameters associated with said virtual link in order to meet the SLA. In some embodiments this may be the only way of creating the E2E virtual path without the need for renegotiation of the SLA. In alternative embodiment adjusting bandwidth within the limit defined by the elasticity parameters increases a pool of possible E2E virtual paths.

A virtual link defines a connection between a pair of border nodes in a network domain. There may be a plurality of border nodes in a network domain and preferably for each pair of border nodes a virtual link is created by the Transport Controller 600. Therefore a virtual path (or end-to-end, E2E, virtual path) in a multi-domain network may traverse more than one domain and in consequence the E2E virtual path will be composed of a plurality of virtual links.

The solution disclosed herein is a method of providing elasticity in a Wide Area Network (WAN) composed by heterogeneous network technologies often supplied by different vendors, which shows another advantage of this solution, that is independence from switching technology and control system of the network domains. Elasticity allows the SDN Orchestrator 702 to work on a virtualised view. As disclosed earlier in a preferred embodiment the following elasticity parameters may be used: maximum elastic bandwidth with traffic interruption; maximum elastic bandwidth without traffic interruption or maximum elastic bandwidth with multipath routing.

The maximum elastic bandwidth with traffic interruption associated with a virtual link indicates the maximum increase of bandwidth that the virtual link can provide without guaranteeing uninterrupted traffic (i.e. traffic interruption may happen).

The maximum elastic bandwidth without traffic interruption indicates the amount of bandwidth that a virtual link can provide with a guarantee of no disruption of traffic.

Finally, the maximum elastic bandwidth with multipath routing indicates the amount of bandwidth that could be provided for sending traffic on two or more paths concurrently.

Figure 5A:
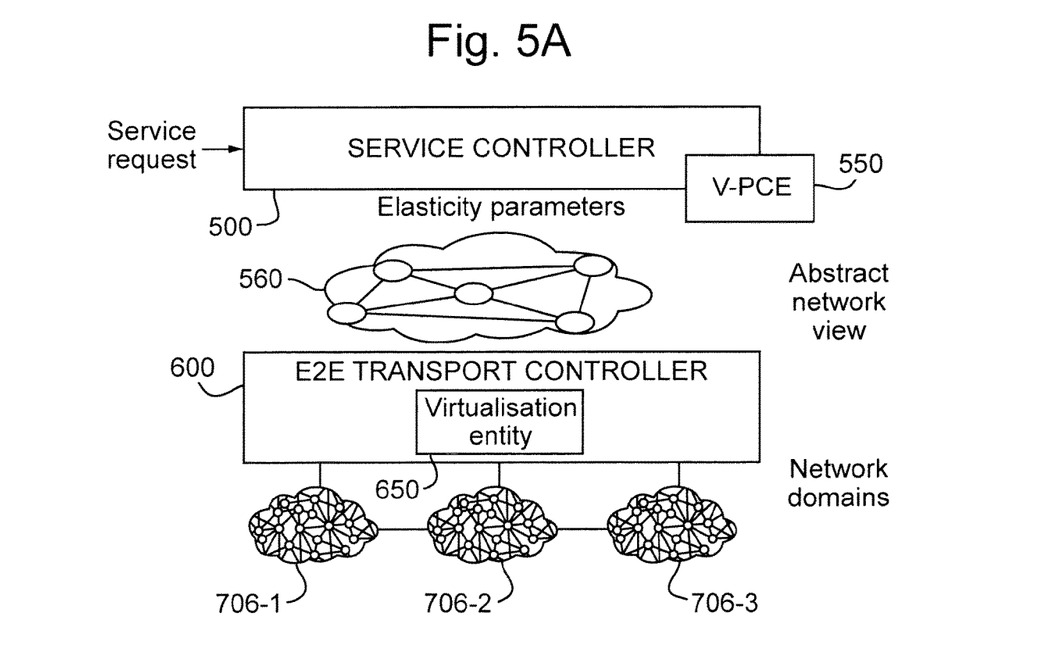
FIG. 5A and FIG. 7 are diagrams illustrating two possible architectures of Software Defined Networking.

To better describe the proposed method in one of its embodiments the general functional architecture, shown in FIG. 5A is taken into account.

The architecture consists of two main functional components: a Service Controller (SC) 500 and a Transport Controller (TC) 600. The SC 500 is appointed to manage E2E resources. The E2E resources are the virtual resources obtained by summarising the available physical resources (e.g., link, bandwidth, elasticity capability). It validates and authorizes resource requests and consequently manages the underlying transport network, three domains of which are shown as 706-1, 706-2, 706-3. The Service Controller 500 works based on a virtualised vision 560 of the physical network. In one embodiment the Service Controller 500 may include a PCE (Path Computation Element) functionalities 550 or it may interact with an external PCE to compute paths across the multi-domain network 706-1-706-3.

The TC 600 is responsible for determining and, in a preferred embodiment, providing an abstract view of the network for an efficient path handling in the upper-layer network, that is in the Service Controller, which performs a more efficient path handling when a virtual topology is provided. To do this, a virtualisation entity collects information provided by each domain and translates it into service parameters. In one embodiment the function of a virtualisation entity 650 is realized by a Path Computation Engine in one of its possible implementations disclosed e.g. in RFC6805 or in WO2011/103913 and WO2011/128002 where the concept of PCE discussed in RFC6805 has been extended. Collecting information provided by each domain individually has the advantage of scalability of the solution.

The implementation of these functional building blocks and the description of the functional interfaces are out of the scope of the present disclosure since they can be implemented according to different architectures using different protocols known in the art. For example, in one embodiment of SDN architecture as presented in FIG. 7 the Service Controller 500 may be implemented in the SDN orchestrator 702, while the Transport Controller 600 may be implemented in the SDN controller 704. Application 1, 708, and Application 2, 710, are two examples of applications enabling certain services in the virtual network. Applications may be related to security, management or other specific functions. They are useful for the Service Controller to perform the role of virtual load balancer, a virtual intrusion detection system (IDS), a virtual firewall, etc. In this sense the applications 708 and 710 can enable service provisioning.

The main advantage of the present solution in its various embodiments is that it enables the Transport Controller 600 to exploit different elasticity capability of each network domain for resource optimization. Elasticity capability informs the Transport Controller 600 about how the elasticity can be provided by each network domain. For example, in one network domain it may be by overprovisioning, in another by re-routing in certain time, or by modifying the amount of bandwidth allocated for the specific path (e.g. in the case of Multiprotocol Label Switching that keeps the same Label Switched Path and modifies the amount of bandwidth). As explained earlier elasticity capability is a characteristic of a network domain. Moreover, the present solution provides the Service Controller 500 with elasticity parameters and in this way enables managing elasticity without knowing the specific techniques implemented in the underlying domains. This is possible because elasticity parameters refer to the virtualised network. In other words, elasticity parameters represent elasticity capability in the virtual network.

Figure 8:
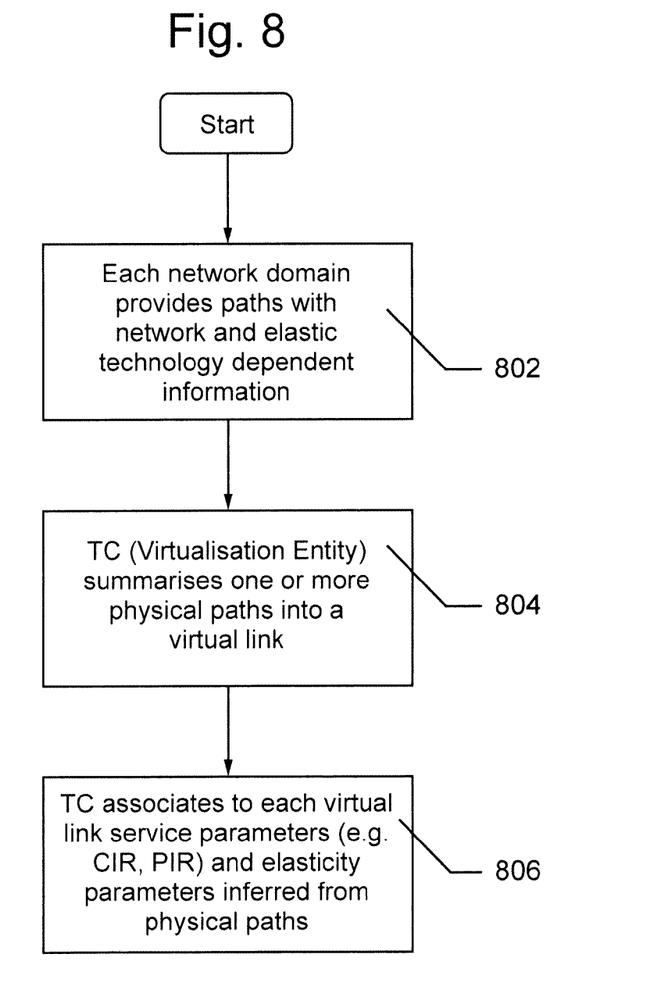
FIG. 8 is a diagram illustrating a method for providing support for elasticity in network virtualisation in one embodiment of the present invention.

In one embodiment, illustrated in FIG. 8, the above may be achieved by receiving, 802, by the Transport Controller 600 information about elasticity capability of the physical links from each network domain. A virtualisation entity 650 of the Transport Controller 600 defines the elasticity parameters to describe the underlying network topology using technology independent, very high level language and summarises 804 physical paths according to QoS (Quality of Service) parameters (e.g., bandwidth, delay) and elasticity parameters into virtual links. Then the Transport Controller associates 806 with each virtual link elasticity parameters inferred from the physical paths and produces a topology of the virtual network.

The elasticity parameters are computed according to the routing and elasticity capability each network domain is able to provide. It is important to highlight that by using elasticity parameters it is possible to provide elasticity independently of the specific technique each domain is able to support. Possible techniques that could be used to support the different types of elasticity are reported in Table 1. Note that the particular techniques individual domains use to provide elasticity are out of scope of this document.

TABLE 1

Elasticity parameters

| Elasticity parameters | Transport techniques to support elasticity |
|---|---|
| With traffic interruption | Rerouting:<br>    Exceed "traffic disruption time" (e.g., more than 50 ms) |
| Without traffic interruption | Increase bandwidth:<br>    MPLS: Bandwidth variation of LSP via RSVP (Resource Reservation Protocol)<br>    Elastic Optical Networking<br>    Overprovisioning<br>Rerouting:<br>    within "traffic disruption time" (e.g., in 50 ms) |
| Multipath routing | Split traffic in more paths:<br>    ECMP (Equal-cost multi-path) |

The topology of the virtual network is provided to the SC 500 and it includes the elasticity parameters associated with the virtual links. This topology of the virtual network is updated when one of the following events occurs: fault, changes in traffic distribution, changes in network resources availability, changes in operator policies.

Figure 9:
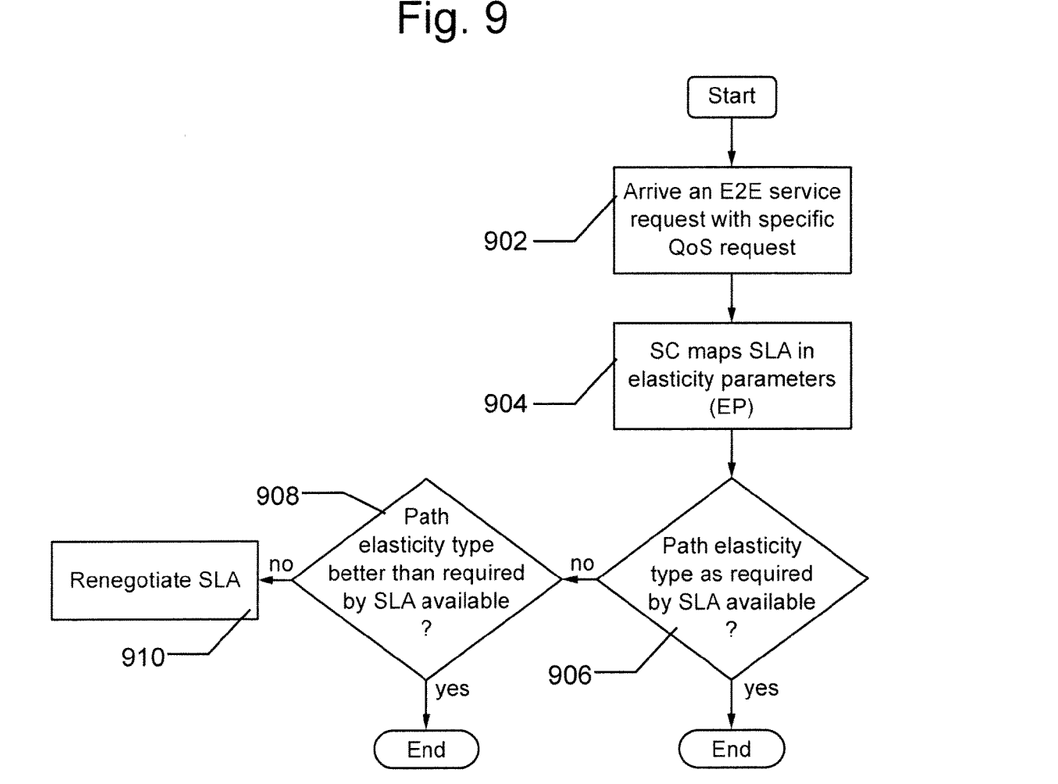
FIG. 9 is a diagram illustrating a method for providing support for elasticity in network virtualisation in one embodiment of the present invention.

Once the topology of the virtual network is received by the Service Controller 500, the SC, in one embodiment, works on the topology of the virtual network according to the workflow illustrated in FIG. 9.

When an E2E service request arrives, 902, with specific QoS request the PCE 550 maps, 904, the SLA associated with the service request onto specific elasticity types: without traffic interruption, with traffic interruption, multipath routing.

This operation may be described as mapping of the service request and/or bandwidth variation of the service request onto the elasticity parameters. For example, let's suppose to have a service request that asks to increase bandwidth, and the SLA for such service does allow for traffic interruption. In step 906 it is checked if there is available path with elasticity type as required by the SLA and if the answer is YES, the method ends. For example, if the SLA specifies elasticity type "With traffic interruption" and the found path provides elasticity type "With traffic interruption" the method ends. However, if in step 906 the answer is NO, then the method follows to step 908. In step 908 it is checked if there is available path with elasticity type better than what is required in the SLA. If the answer in step 908 is YES the request is fulfilled and the method ends. For example, if the SLA specifies elasticity type "With traffic interruption" and the found path provides elasticity type "Without traffic interruption", then the better elasticity type "Without traffic interruption" is provided. In this way in order to fulfill the request the method will use the lowest elasticity type that meets the requirements of the SLA and saves paths with better elasticity types for more demanding SLAs. If the answer in step 908 is NO then the SLA must be renegotiated. This is a clear advantage that the elasticity can be used in a flexible way to enable resource optimization in the network transport domains. Preventing wasteful allocation of resources is possible in virtualised network environment when the Service Controller has knowledge about the different elasticity of the different virtual links.

In a preferred embodiment a peak bandwidth (maximum bandwidth that the service may require) may be associated to each type of service and this value may be used to establish if elasticity can or cannot be provided. Moreover in another preferred embodiment, on the basis of the traffic category it can be decided to associate elasticity with or without traffic interruption. For example, a real-time Variable Bit Rate traffic (e.g., video streaming) may require elasticity type "Without traffic interruption".

The Service Controller 500 computes an E2E path that will satisfy the service request. The Service Controller 500 manages the allocation of virtual resources by using a virtualised PCE (Path Computation Engine) 550. In different embodiments such virtualised PCE may be implemented differently, for example, the virtualised PCE may be internal to the Service Controller 500 or, alternatively, it may be an external application.

Figure 11:
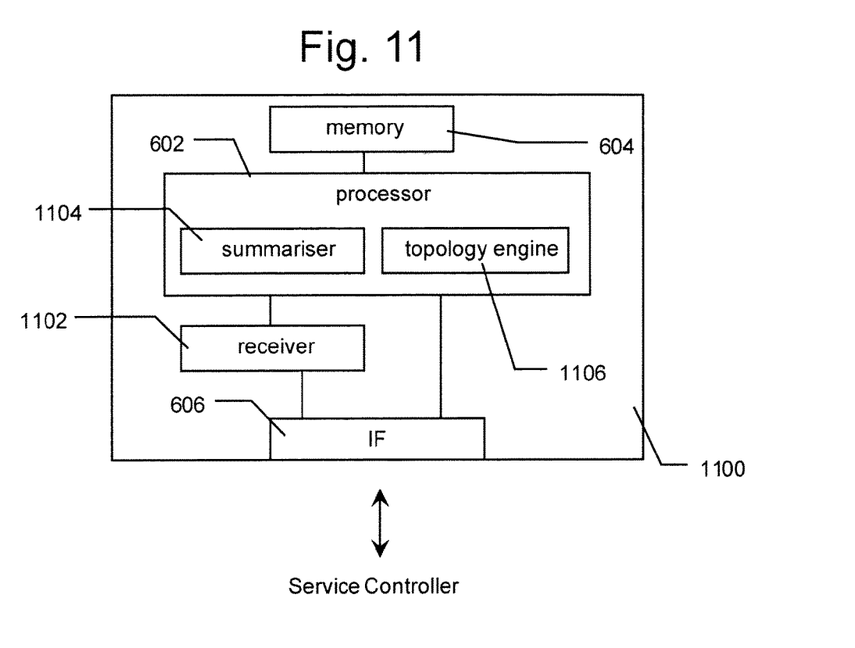
FIG. 11 is a diagram illustrating a transport controller in one embodiment of the present invention.
Figure 12:
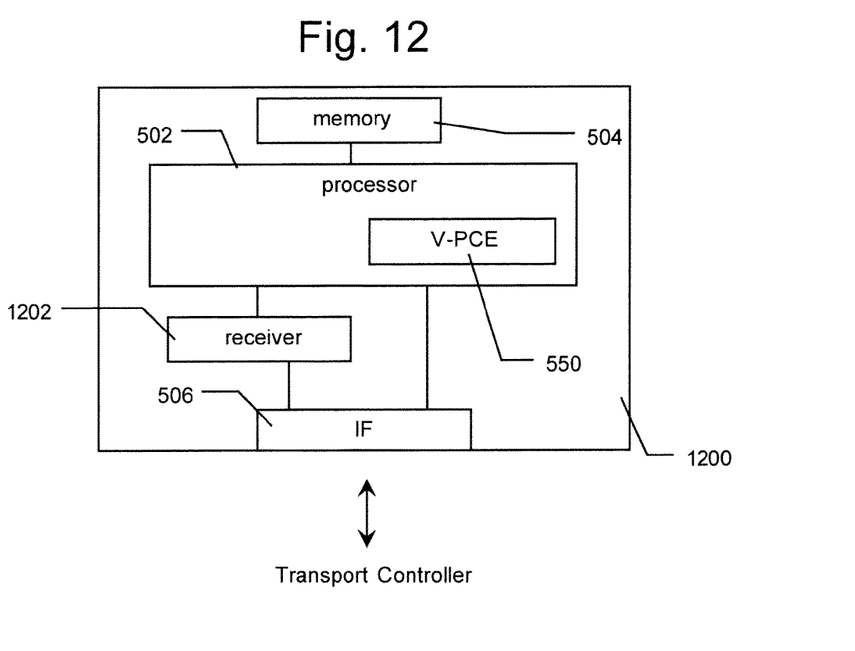
FIG. 12 is a diagram illustrating a service controller in one embodiment of the present invention.

With reference to FIGS. 11 and 12 alternative embodiments of the Transport Controller, 1100, and the Service Controller, 1200 are presented.

The Transport Controller 1100 for providing support for elasticity in network virtualisation of a heterogeneous, multi-domain network shown in FIG. 11 comprises a receiver, 1102, for receiving from network domains information about elasticity capability of physical paths in said network domains and a summariser, 1104 for summarising physical paths in said network domains into virtual links. The Transport Controller 1100 further comprises a topology engine, 1106, for producing a topology of a virtual network overlaying the multi-domain network by associating elasticity parameters with the virtual links, wherein the elasticity parameters are inferred from the physical paths. In a preferred embodiment the summariser 1104 and topology engine 1106 operate in a processor 602 operatively coupled to a memory 604.

The Service Controller, 1200, for routing a service through a heterogeneous, multi-domain network in response to a service request shown in FIG. 12 comprises a receiver, 1202, for receiving from a Transport Controller a topology of a virtual network overlaying the multi-domain network. The received topology of the virtual network has been produced by associating elasticity parameters with virtual links, and the virtual links have been created by summarising physical paths. The elasticity parameters have been inferred from the physical paths, wherein information about elasticity capability of physical paths in said network domains has been received by said Transport Controller from said network domains. The Service Controller, 1200, further comprises a virtualised Path Computation Engine, 550, for computing an end-to-end virtual path across the virtual network in response to the service request based on a Service Level Agreement associated with the service request and the elasticity parameters of the virtual links. In a preferred embodiment the virtualised Path Computation Engine 550 operates in a processor 502 operatively coupled to a memory 504.

The solution described in this document in its various embodiments has numerous advantages and one of the most important ones is exploitation of different elasticity capability of the network domains according technology or control of each domain. The solution also simplifies of cross-optimization of datacenter orchestration with the transport layer.

The invention claimed is:

1. A method for providing support for elasticity in network virtualization of a heterogeneous, multi-domain network, the method comprising:
    receiving, from a plurality of network domains in the hetergeneous, multi-domain network, information about elasticity capability of physical paths in the plurality of network domains, the elasticity capability comprising the ability of each one of the plurality of network domains to add or release physical resources to meet service requirements;

summarizing the physical paths in the plurality of network domains into at least one virtual link;

producing a topology of a virtual network overlaying the heterogeneous, multi-domain network by associating elasticity parameters with the at least one virtual link, wherein the elasticity parameters represent the elasticity capabilities of the physical paths.

2. The method as defined in claim 1 comprising transferring said topology of said virtual network to a Service Controller.

3. The method as defined in claim 1, wherein the elasticity capability of said physical paths is received as information about elasticity capability of a plurality of physical links forming said physical paths.

4. The method as defined in claim 1, wherein the information about elasticity capability of said physical paths is received as part of information about service network parameters.

5. The method as defined in claim 4, wherein the service network parameters received from network domains include one or more of availability of resources, delay, resiliency or jitter.

6. The method as defined in claim 1, wherein the elasticity parameters include one or more of: maximum elastic bandwidth with traffic interruption, maximum elastic bandwidth without traffic interruption and maximum elastic bandwidth with multipath routing.

7. The method as defined in claim 1 performed in a Transport Controller.

8. A Transport Controller for providing support for elasticity in network virtualization of a heterogeneous, multi-domain network, the Transport Controller comprising:
a processor; and
memory containing instructions executable by said processor to cause the Transport Controller to:
receive, from a plurality of network domains in the heterogeneous, multi-domain network, information about elasticity capability of physical paths in the plurality of network domains, the elasticity capability comprising the ability of each one of the plurality of network domains to add or release physical resources to meet service requirements;
summarize the physical paths in the plurality of network domains into at least one virtual link; and
produce a topology of a virtual network overlaying the heterogeneous, multi-domain network by associating elasticity parameters with the at least one virtual link, wherein the elasticity parameters represent the elasticity capabilities of the physical paths.

9. The Transport Controller according to claim 8 operative to transfer said topology of said virtual network to a Service Controller for use in computing an end-to-end virtual path across the virtual network.

10. The Transport Controller according to claim 8 operative to receive the elasticity capability of said physical paths as information about elasticity capability of a plurality of physical links forming said physical paths.

11. The Transport Controller according to claim 8 operative to receive the information about the elasticity capability of the physical paths as part of information about service network parameters.

12. The Transport Controller according to claim 8 wherein the service network parameters received from the plurality of network domains include one or more of availability of resources, delay, resiliency or jitter.

13. The Transport Controller according to claim 8 wherein the elasticity parameters include one or more of: maximum elastic bandwidth with traffic interruption, maximum elastic bandwidth without traffic interruption and maximum elastic bandwidth with multipath routing.

14. A Service Controller for use in routing a service through a heterogeneous, multi-domain network in response to a service request, the Service Controller comprising:
a processor; and
memory containing instructions executable by said processor to cause said Service Controller to:
receive from a Transport Controller a topology of a virtual network overlaying the heterogenous, multi-domain network, wherein the topology of the virtual network was produced by associating elasticity parameters with at least one virtual link, wherein the at least one virtual link have been created by summarizing physical paths and the elasticity parameters represent the elasticity capabilities of the physical paths, and wherein information about elasticity capability of physical paths in a plurality of network domains has been received by said Transport Controller from said network domains, the elasticity capability comprising the ability of each one of the plurality of network domains to add or release physical resources to meet service requirements; and
compute an end-to-end virtual path across the virtual network in response to the service request based on a Service Level Agreement associated with the service request and the elasticity parameters of the virtual links.

15. The Service Controller as defined in claim 14, operative to receive the information about the elasticity capability of the physical paths as part of information about service network parameters.

* * * * *

UNITED STATES PATENT AND TRADEMARK OFFICE
CERTIFICATE OF CORRECTION

PATENT NO. : 10,225,173 B2
APPLICATION NO. : 15/127856
DATED : March 5, 2019
INVENTOR(S) : Iovanna et al.

Page 1 of 1

It is certified that error appears in the above-identified patent and that said Letters Patent is hereby corrected as shown below:

In the Specification

In Column 3, Line 17, delete "an eight" and insert -- an eighth --, therefor.

In Column 3, Line 35, delete "links" and insert -- links. --, therefor.

In Column 4, Line 43, delete "no a solution" and insert -- no solution --, therefor.

In Column 5, Line 25, delete "according its" and insert -- according to its --, therefor.

In Column 7, Line 32, delete "this techniques" and insert -- this technique --, therefor.

In Column 7, Line 39, delete "etc. . . ." and insert -- etc. --, therefor.

In the Claims

In Column 12, Line 65, in Claim 1, delete "hetergeneous," and insert -- heterogeneous, --, therefor.

Signed and Sealed this
Twenty-first Day of May, 2019

Andrei Iancu
*Director of the United States Patent and Trademark Office*